Figure 1:
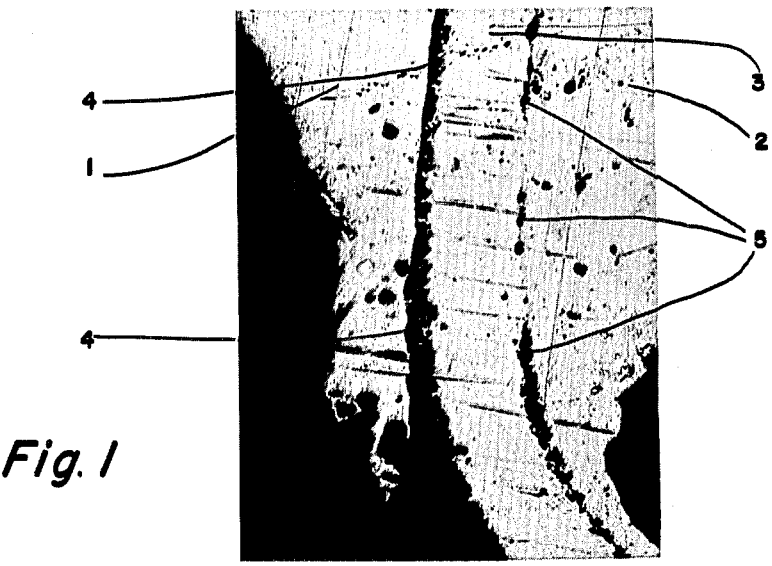

Aug. 3, 1965 A. T. CAPE 3,198,609
BRAZED STRUCTURE AND METHOD OF BRAZING
Filed Jan. 22, 1964

INVENTOR.
ARTHUR T. CAPE
BY
ATTORNEYS

United States Patent Office 3,198,609
Patented Aug. 3, 1965

3,198,609
BRAZED STRUCTURE AND METHOD
OF BRAZING
Arthur T. Cape, Monterey, Calif., assignor to Coast Metals, Inc., Little Ferry, N.J., a corporation of Delaware
Filed Jan. 22, 1964, Ser. No. 339,557
4 Claims. (Cl. 29—196)

This application is a continuation-in-part of my copending application, Serial No. 28,224, filed May 11, 1960, and now abandoned.

This invention relates generally to methods of brazing, but has reference more particularly to methods of brazing in which brazing alloys of the copper-manganese type are employed, and to the use of such alloys for brazing complicated parts such as honeycomb structures, which present difficulties when completely sound joints are essential.

Equilibrium diagrams, which were published some years ago, suggested the possibility of using copper-manganese alloys for brazing, as their melting points in the range of 85% copper–15% manganese to 55% manganese–45% copper, are lower than those of copper, nickel-silicon-boron alloys, and the manganese-base alloys.

However, attempts to use such copper-manganese alloys for brazing stainless steel and super alloys caused the disastrous effect known as "crevice corrosion," and created serious objections in the minds of engineers toward the use for grazing purposes of any alloy containing manganese. Crevice corrosion is the separation of a brazing alloy from the base metals, i.e., the metals being brazed, apparently caused by a concentration cell, which forms when moisture is present. One of the quick methods of determining whether this effect exists in a brazed system is to run the brazed structure for 96 hours in a standard salt spray test. The braze may separate cleanly from the base in a matter of hours, but microscopic examination determines very quickly whether there is even a remote sign of crevice corrosion.

I have found that the addition of nickel, in a substantial amount, to such copper-manganese alloys is effective primarily to prevent such crevice corrosion, and secondarily, to increase the high temperature properties or strength of the brazing alloys. The prevent of crevice corrosion is particularly important when the alloy is used for brazing the iron-base stainless steels. Two such steels of the precipitation hardening type are 17–7 PH and 15–7 PH and are often used in honeycomb structures. A straight copper-manganese alloy is a very satisfactory alloy for joining such structures, but when the brazed honeycomb is subjected to the standard salt spray test, crevice corrosion is so marked as to cause complete separation of the parts in less than 24 hours. The same disintegration will take place in a humid atmosphere, but over a longer period of time.

The addition of nickel to such copper-manganese alloys, in amounts of from about 3 to 20%, has been found to prevent such crevice corrosion, while, at the same time, the addition of nickel in these amounts does not increase the melting point of the alloys appreciably.

The brazing alloys which may be be used for the brazing of stainless steels and super alloys of the type referred to consist of from about 35% to about 70% copper, from about 3 to about 20% nickel, and the balance essentially all manganese, the ratio of manganese to nickel being not less than 2.25:1. This minimum ratio is required, so that the alloys will not only be satisfactory from the viewpoint of prevent of crevice corrosion, but will be satisfactory for brazing, since any lower ratio of manganese to nickel would produce alloys having melting points in excess of about 1900° F.

Figure 2:

The effect of the use of even 3% nickel in such alloys is illustrated in the accompanying photomicrographs, taken at a magnifiication of 500×, in which FIG. 1 shows the microstructure of a brazed structure embodying a brazing alloy consisting of 69% copper, 29.5% manganese, and 1.5% nickel, and FIG. 2 shows the microstructure of a brazed structure embodying a brazing alloy consisting of 67.5% copper, 29.5% manganese, and 3% nickel.

In FIG. 1, the brazing alloy is designated by reference numerals 1 and 2, and has been brazed, at a temperature of about 1800° F., to a foil 3, consisting of 17–7 PH stainless steel, and the brazed structure subjected to the salt spray test hereinbefore described.

An examination of the structure in FIG. 1 shows advanced crevice corrosion in the joint area 4, and less advanced, but nevertheless substantial crevice corrosion in the joint areas 5 of the brazed structure.

In FIG. 2, the brazing alloy is designated by reference numeral 6, and has been brazed, at a temperature of about 1800° F., to a part 7, consisting of 17–7 PH stainless steel, and the brazed structure subjected to the salt spray test hereinbefore described.

An examination of the structure in FIG. 2 shows that there is no cervice corrosion at the joint or interface area 8 of the brazed structure.

Examples of brazing alloys which fall within the foregoing ranges, and which are particularly adaptable for the present brazing process are as follows:

|  | No. 1 | No. 2 | No. 3 | No. 4 |
|---|---|---|---|---|
| Copper_____percent___ | 42 | 52.5 | 67.5 | 67.5 |
| Nickl_____do___ | 11 | 9.0 | 9.0 | 3.0 |
| Manganese_____do___ | 47 | 38.5 | 23.5 | 29.5 |

The No. 2 alloy may be used in the form of powder, wire or foil, and was developed specifically for the brazing and welding of various stainless steels and a number of the newer high strength alloys. It provides sound joints, with good physical properties, has low erosion characteristics and excellent resistance to crevice corrosion.

In the form of either wire, foil or powder, it is well adapted to controlled atmosphere brazing with hydrogen or inert gases. The brazing temperature is relatively low and the alloy has little tendency to wet or flood excessively. It will bridge gaps up to .010 in. and may be used in making heavy fillets. In the form of wire, it has good welding properties and may be used in various insert-arc processes, including tig and sigma welding.

In general, its principal field of application is in the brazing of precipitation hardening stainless steels, and other high strength alloys, where a brazing temperature below the critical point of the base metal is required in order to avoid grain growth. Typical specific applications include the fabrication of honeycomb structures, the joining of tubing and the assembling of parts made of such materials as 300 series stainless steels
          400 series stainless steels
          AM–350 alloy steel
          H–11 alloy steel
          SAE 4130 alloy steel Its liquidus is about 1660° F., its solidus about 1620° F., and its recommended brazing temperature about 1700° F.

Its physical properties, in the annealed condition, are as follows:

Ultimate strength _____p.s.i__ 90,000
Yield strength _____p.s.i__ 47,000
Elongation _____percent__ 25

The No. 3 alloy may also be used in the form of powder, wire or foil, for controlled atmosphere brazing with hydrogen or inert gases. It produces sound, tight joints with excellent strength retention at elevated service temperatures in a wide range of high strength steels. Its oxidation and corrosion resistance is good. In the form of wire, the alloy has good welding properties and is well suited to use with the inert arc processes.

The principal use of this No. 3 alloy is in the brazing and welding of high alloy steels, particularly where thin sections are involved and a minimum of penetration or erosion is required. Brazing of 347 and 321 stainless steels, precipitation hardening stainless steels in the 300 series, and heat resisting steels are typical examples.

The liquidus of the No. 3 alloy is about 1710° F., its solidus about 1670° F., and its recommended brazing temperature about 1800° F.

Its physical properties, in the annealed condition, are as follows:

| | |
|---|---|
| Ultimate strength _____ p.s.i__ | 99,000 |
| Yield strength _____ p.s.i__ | 52,000 |
| Elongation _____ percent__ | 20 |

It will be understood that slight changes may be made in the alloy, without departing from the spirit of the invention, or the scope of the appended claims.

Having thus described my invention, I claim:

1. In the brazing of parts of stainless steel and super alloys, the step of brazing the parts by interposing between the parts to be brazed a brazing alloy consisting of from about 35% to about 70% copper, about 3% to about 20% nickel, and the remainder essentially all manganese, the ratio of manganese to nickel being not less than 2.25:1, and heating the parts and brazing alloy to a brazing temperature within the range of from about 1650° F. to about 1850° F., whereby the parts are brazed to each other, and the nickel is effective to prevent crevice corrosion.

2. In the brazing of parts of stainless steel and super alloys, the step of brazing the parts by interposing between the parts to be brazed a brazing alloy consisting of about 52.5% copper, about 9.0% nickel, and about 38.5% manganese, and heating the parts and brazing alloy to a brazing temperature of about 1700° F., whereby the parts are brazed to each other, and the nickel is effective to prevent crevice corrosion.

3. In the brazing of parts of stainless steel and super alloys, the step of brazing the parts by interposing between the parts to be brazed a brazing alloy consisting of about 67.5% copper, about 9.0% nickel, and about 23.5% manganese, and heating the parts and brazing alloy to a brazing temperature of about 1800° F., whereby the parts are brazed to each other, and the nickel is effective to prevent crevice corrosion.

4. A brazed structure comprising metal parts selected from the group consisting of stainless steels and super alloys, and in which it is desired to prevent crevice corrosion resulting from the brazing of such parts, and a brazing alloy fused to and joining said parts, said brazing alloy consisting of from about 35% to about 70% copper, about 3% to about 20% nickel, and the remainder essentially all manganese, the ratio of manganese to nickel being not less than 2.25:1.

References Cited by the Examiner

UNITED STATES PATENTS

| | | |
|---|---|---|
| 2,202,012 | 5/40 | Long. |
| 3,005,258 | 10/61 | Sangdahl _____ 29—494 |

FOREIGN PATENTS

| | | |
|---|---|---|
| 526,033 | 9/40 | Great Britain. |

JOHN F. CAMPBELL, *Primary Examiner.*